United States Patent
Singh (10) Patent No.: US 9,551,805 B2
(45) Date of Patent: Jan. 24, 2017

(54) APPARATUS, SYSTEM, AND METHOD FOR DETECTING A FOREIGN OBJECT IN AN INDUCTIVE WIRELESS POWER TRANSFER SYSTEM VIA COUPLING COEFFICIENT MEASUREMENT

(75) Inventor: Manjit Singh, Fremont, CA (US)

(73) Assignee: INTEGRATED DEVICE TECHNOLOGY, INC., San Jose, CA (US)

( * ) Notice: Subject to any disclaimer, the term of this patent is extended or adjusted under 35 U.S.C. 154(b) by 804 days.

(21) Appl. No.: 13/435,996

(22) Filed: Mar. 30, 2012

(65) Prior Publication Data

US 2013/0257165 A1 Oct. 3, 2013

(51) Int. Cl.
*H01F 38/00* (2006.01)
*G01V 3/12* (2006.01)
*H02J 5/00* (2016.01)

(52) U.S. Cl.
CPC . *G01V 3/12* (2013.01); *H02J 5/005* (2013.01)

(58) Field of Classification Search
CPC ............ H01F 38/14; H02J 17/00; H02J 5/005; H02J 7/025
USPC .......................................... 307/104; 320/108
See application file for complete search history.

(56) References Cited

U.S. PATENT DOCUMENTS

| | | | |
|---|---|---|---|
| 7,310,245 B2 | 12/2007 | Ohbo | |
| 2006/0049903 A1* | 3/2006 | Wolfgram | 336/180 |
| 2007/0228833 A1 | 10/2007 | Stevens et al. | |
| 2009/0026844 A1 | 1/2009 | Iisaka et al. | |
| 2009/0224723 A1 | 9/2009 | Tanabe | |

(Continued)

FOREIGN PATENT DOCUMENTS

| | | |
|---|---|---|
| GB | 2414121 A | 11/2005 |
| JP | 201183094 A | 4/2011 |
| WO | 2009081115 A1 | 7/2009 |

OTHER PUBLICATIONS

"Toto Sakioto", "Theoretical and empirical comparison of coupling coefficient and refractive index estimation for coupled waveguide fiber", Journal of applied science & engineering technology 2008, http://library.rit.edu/oajournals/index.php/%EE%80%80jaset%EE%80%81/article/viewFile/127/133.*

(Continued)

*Primary Examiner* — Jared Fureman
*Assistant Examiner* — Alfonso Perez Borroto
(74) *Attorney, Agent, or Firm* — Haynes & Boone LLP (57) ABSTRACT

An inductive wireless power device comprises a transmitter configured to generate an electromagnetic field to a coupling region for wireless power transfer to a receiver, and control logic configured to determine a coupling coefficient of the wireless power transfer when the receiver is within the coupling region. The control logic also determines a presence of a foreign object within the coupling region responsive to a comparison of the determined coupling coefficient and an expected coupling coefficient for the wireless power transfer. An inductive wireless power device comprises a receiver configured to couple with an electromagnetic field in a coupling region for inductive wireless power transfer from a transmitter. The receiver is configured to alter a wireless power transfer characteristic of the transmitter for a determination of a presence of a foreign object within the coupling region responsive to a determination of a coupling coefficient of the wireless power transfer.

24 Claims, 4 Drawing Sheets

(56) References Cited

U.S. PATENT DOCUMENTS

| | | |
|---|---|---|
| 2009/0322280 A1 | 12/2009 | Kamijo et al. |
| 2010/0007307 A1 | 1/2010 | Baarman et al. |
| 2010/0123430 A1 | 5/2010 | Kojima et al. |
| 2011/0128108 A1* | 6/2011 | Kijima .................. 336/200 |
| 2011/0181473 A1 | 7/2011 | Sulkowski, Jr. et al. |
| 2011/0196544 A1* | 8/2011 | Baarman et al. ............ 700/291 |
| 2012/0001493 A1* | 1/2012 | Kudo et al. .................. 307/104 |
| 2012/0080957 A1* | 4/2012 | Cooper .................. H02J 5/005 |
| | | 307/104 |
| 2012/0146576 A1 | 6/2012 | Partovi |
| 2012/0149301 A1* | 6/2012 | Wiley .......................... 455/41.1 |
| 2012/0153740 A1 | 6/2012 | Soar |
| 2012/0175967 A1* | 7/2012 | Dibben .................. H02J 5/005 |
| | | 307/104 |
| 2012/0217816 A1* | 8/2012 | Wang .................... H02J 5/005 |
| | | 307/104 |
| 2013/0026981 A1 | 1/2013 | Van Der Lee |
| 2013/0088090 A1* | 4/2013 | Wu ........................ H01F 27/00 |
| | | 307/104 |
| 2013/0094598 A1 | 4/2013 | Bastami |
| 2013/0134797 A1* | 5/2013 | Kanno .................... H01F 38/14 |
| | | 307/104 |
| 2013/0135041 A1* | 5/2013 | Slupsky ................. G08C 17/04 |
| | | 327/564 |
| 2013/0154554 A1* | 6/2013 | Sakai et al. ................... 320/108 |

OTHER PUBLICATIONS

Sakioto, et al. "Theoretical and empirical comparison of coupling coefficient and refractive index estimation for coupled waveguide fiber", Journal of applied science & engineering technology 2008, <<http://library.rit.edu/oajournals/index.php/%EE%80%80jaset%EE%80%81/article/viewFile/127/133>>.

* cited by examiner

FIG. 5

APPARATUS, SYSTEM, AND METHOD FOR DETECTING A FOREIGN OBJECT IN AN INDUCTIVE WIRELESS POWER TRANSFER SYSTEM VIA COUPLING COEFFICIENT MEASUREMENT

CROSS REFERENCE TO RELATED CASES

This application is related to co-pending U.S. patent application Ser. No. 13/272,774, filed Oct. 13, 2011, entitled "Apparatus, System, and Method for Detecting a Foreign Object in an Inductive Wireless Power Transfer System." This application is also related to co-pending U.S. patent application Ser. No. 13/436,309, filed Mar. 30, 2012, which is entitled "Apparatus, System, and Method for Detecting a Foreign Object in an Inductive Wireless Power Transfer System Based on Input Power."

FIELD

Embodiments of the present disclosure relate generally to inductive wireless power transfer and, more particularly, to apparatuses, systems, and methods related to detecting a foreign object that is present during inductive wireless power transfer.

BACKGROUND

Battery-powered devices (e.g., consumer electronic devices, electric and hybrid automobiles, etc.) are often charged from a power source (e.g., AC power outlet) through a charging device. The charging device couples the battery to the power source through an adaptor. The cord extending between the power source and the battery-powered device can take up space. In situations where multiple battery-powered devices require charging, each with their own charger and cord, the charging area can become cramped and disorganized.

Approaches are being developed that use over-the-air (i.e., wireless) power transmission between a transmitter and a receiver coupled to the electronic device. Wireless power transmission using an inductive coil is one method considered as an un-tethered method for transferring power wirelessly through a coupled electromagnetic field. In inductive wireless power transmission, power is transferred by transmitting an electromagnetic field through a transmit coil. On the receiver side, a receiver coil may couple with the transmit coil through the electromagnetic field, thus, receiving the transmitted power wirelessly.

A foreign object (e.g., metallic object) may be positioned within the near-field zone, such as between the transmitter and the receiver. As wireless power charging become ubiquitous and mainstream, the efficiency as well as safety aspects of this technology related to the detection of foreign objects may be a concern for the end user original equipment manufacturers (OEMs).

BRIEF SUMMARY

Embodiments of the present disclosure include an inductive wireless power device. The inductive wireless power device a transmitter configured to generate an electromagnetic field to a coupling region for inductive wireless power transfer to a receiver, and control logic configured to determine a coupling coefficient of the wireless power transfer when the receiver is within the coupling region. The control logic is further configured to determine a presence of a foreign object within the coupling region responsive to a comparison of the determined coupling coefficient and an expected coupling coefficient for the wireless power transfer.

Another embodiment of the present disclosure includes an inductive wireless power device. The inductive wireless power device comprises a receiver configured to couple with an electromagnetic field in a coupling region for inductive wireless power transfer from a transmitter. The receiver is configured to alter a wireless power transfer characteristic of the transmitter for a determination of a presence of a foreign object within the coupling region responsive to a determination of a coupling coefficient of the wireless power transfer.

Another embodiment of the present disclosure includes an inductive wireless power transfer system. The inductive wireless power transfer system comprises a wireless power transmitting apparatus configured to generate an electromagnetic field in a coupling region for wireless power transfer, and a wireless power receiving apparatus configured to couple with the electromagnetic field and generate an output signal in response thereto. At least one of the wireless power transmitting apparatus and the wireless power receiving apparatus is configured to determine a presence of a foreign object within the coupling region based, at least in part, on determining a coupling coefficient for the wireless power transfer between the wireless power transmitting apparatus and the wireless power receiving apparatus.

In another embodiment, a method for detecting a foreign object in a coupling region of an inductive wireless power transfer system is provided. The method comprises determining a coupling coefficient for wireless power transfer between a transmitter and receiver, and determining a presence of a foreign object based, at least in part, on a comparison of the determined coupling coefficient and an expected coupling coefficient.

In another embodiment, a method is provided for altering a wireless power transfer characteristic of a wireless power transmitter for a determination of a presence of a foreign object within the coupling region of a wireless power transfer system. The method comprises shorting a receive coil of a receiver at a first time for a wireless power transmitter to determine a wireless power transfer characteristic in a first state, and operating the receive coil of the receiver in a non-shorted state for the wireless power transmitter to determine the wireless power transfer characteristic in a second state.

DETAILED DESCRIPTION

In the following description, reference is made to the accompanying drawings in which is shown, by way of illustration, specific embodiments of the present disclosure. Other embodiments may be utilized and changes may be made without departing from the scope of the disclosure. The following detailed description is not to be taken in a limiting sense, and the scope of the present invention is defined only by the appended claims.

Furthermore, specific implementations shown and described are only examples and should not be construed as the only way to implement or partition the present disclosure into functional elements unless specified otherwise herein. It will be readily apparent to one of ordinary skill in the art that the various embodiments of the present disclosure may be practiced by numerous other partitioning solutions.

In the following description, elements, circuits, and functions may be shown in block diagram form in order not to obscure the present disclosure in unnecessary detail. Additionally, block definitions and partitioning of logic between various blocks is exemplary of a specific implementation. It will be readily apparent to one of ordinary skill in the art that the present disclosure may be practiced by numerous other partitioning solutions. Those of ordinary skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal.

The various illustrative logical blocks, modules, and circuits described in connection with the embodiments disclosed herein may be implemented or performed with a general-purpose processor, a special-purpose processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A general-purpose processor may be considered a special-purpose processor while the general-purpose processor executes instructions (e.g., software code) stored on a computer-readable medium. A processor may also be implemented as a combination of computing devices, such as a combination of a DSP and a microprocessor, a plurality of microprocessors, one or more microprocessors in conjunction with a DSP core, or any other such configuration.

Also, it is noted that the embodiments may be described in terms of a process that may be depicted as a flowchart, a flow diagram, a structure diagram, or a block diagram. Although a process may describe operational acts as a sequential process, many of these acts can be performed in another sequence, in parallel, or substantially concurrently. In addition, the order of the acts may be re-arranged. A process may correspond to a method, a function, a procedure, a subroutine, a subprogram, etc. Furthermore, the methods disclosed herein may be implemented in hardware, software, or both. If implemented in software, the functions may be stored or transmitted as one or more instructions or code on computer readable media. Computer-readable media includes both computer storage media and communication media, including any medium that facilitates transfer of a computer program from one place to another.

It should be understood that any reference to an element herein using a designation such as "first," "second," and so forth does not limit the quantity or order of those elements, unless such limitation is explicitly stated. Rather, these designations may be used herein as a convenient method of distinguishing between two or more elements or instances of an element. Thus, a reference to first and second elements does not mean that only two elements may be employed or that the first element must precede the second element in some manner. In addition, unless stated otherwise, a set of elements may comprise one or more elements.

Figure 1A:
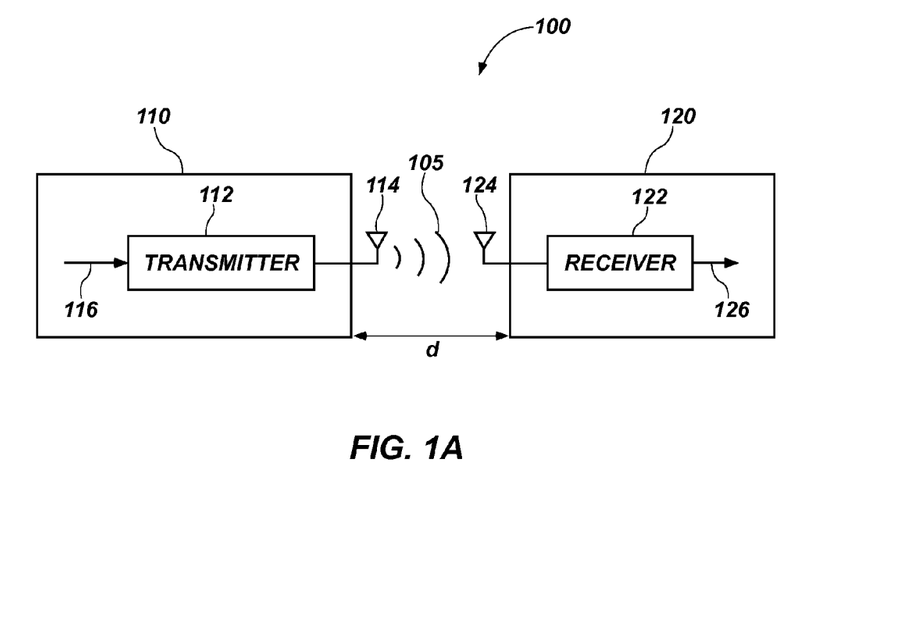
FIG. 1A is a schematic block diagram of an inductive wireless power transfer system according to an embodiment of the present disclosure.

FIG. 1A is a schematic block diagram of an inductive wireless power transfer system 100. The inductive wireless power transfer system 100 includes a wireless power transmitting apparatus 110, and a wireless power receiving apparatus 120. The wireless power transmitting apparatus 110 includes a transmitter 112 having a transmit coil 114 configured to generate an electromagnetic field 105 for providing energy transfer to the wireless power receiving apparatus 120. The wireless power receiving apparatus 120 includes a receiver 122 having a receive coil 124 configured to couple with the electromagnetic field 105. The transmit coil 114 and the receive coil 124 may be sized according to the particular devices and applications to be associated therewith.

The transmitter 112 and the receiver 122 are separated by a distance (d). In some embodiments, the transmitter 112 and the receiver 122 may be configured according to a mutual inductance relationship, such that when the resonant frequency of the receiver 122 and the resonant frequency of the transmitter 112 are substantially identical, transmission losses between the transmitter 112 and the receiver 122 are minimal. Likewise, the frequency of the wireless power signal 105 may be set by the transmitter 112 at or neat the resonant frequencies of the coils 114, 124. As a result, an efficient energy transfer occurs by coupling a large portion of the energy in the near-field of the transmit coil 114 to the receive coil 124 rather than propagating most of the energy in an electromagnetic wave to the far-field. If the wireless power receiving apparatus 120 is in the near-field, a coupling mode may be developed between the transmit coil 114 and the receive coil 124. The area around the transmit coil 114 and receive coil 124 where this near-field coupling may occur may be referred to as a coupling region.

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The desired distance (d) separating the transmitter 112 and the receiver 122 may be a standard distance (e.g., 2 mm) that is determined by the Wireless Power Consortium (WPC). In some embodiments, the transmit coil 114 and the receive coil 124 may include magnetically attractive elements that assist in ensuring that the transmitter 112 and the receiver 122 remain at a known fixed distance (e.g., 2 mm) during wireless power transfer. In other words, employing a magnetically-guided topology that aligns the transmitter 112 and the receiver 122 may ensure that the transmitter 112 and the receiver 122 align within a relatively tight fixed vertical distance. For example, the transmitter 112 may include a magnet, while the receiver 122 may include an attractor (or vice versa).

The transmit coil 114 and the receive coil 124 may be considered like antennas that may be configured as a "loop" antenna, which may also be referred to herein as a "magnetic" antenna or an "inductive" antenna. Loop antennas may be configured to include an air core or a physical core such as a ferrite core. Air core loop antennas may be more tolerable to extraneous physical devices placed in the vicinity of the core. Furthermore, an air core loop antenna allows the placement of other components within the core area. In addition, an air core loop may more readily enable placement of the receive coil 124 within a plane of the transmit coil 114 where the coupling region of the transmit coil 114 may be more powerful.

The wireless power transmitting apparatus 110 may be a wireless power charger. The wireless power receiving apparatus 120 may be a mobile electronic device such as a cell phone, smart phone, media player (e.g., mp3 player), electronic reader, tablet, personal digital assistant (PDA), camera, lap top computer, and personal electronic device in which wireless power may be received. The wireless power receiving apparatus 120 may also be a less mobile electronic device, such as a television, personal computer, media player (e.g., DVD player, Blu-ray player, etc.) or any other device that may operate by, and/or store electrical power. The wireless power receiving apparatus 120 may be one of a number of other items, such as an automobile or any other devices that may include batteries that may be charged through the wireless power transmitting apparatus 110. In some embodiments, the wireless power transmitting apparatus 110 may be a device that may, at times, also be the recipient of wireless power transfer. In other words, some devices may be configured as both a wireless power transmitting apparatus 110 and a wireless power receiving apparatus 120, such that the device may transmit wireless power or receive wireless power depending on the mode of operation.

Figure 1B:
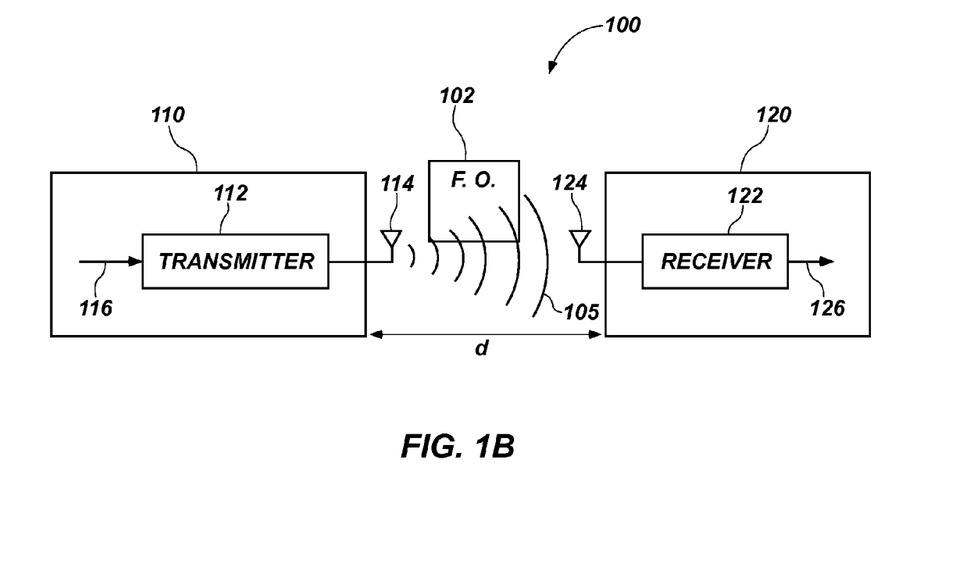
FIG. 1B is the inductive wireless power transfer system having a foreign object present within the electromagnetic field according to an embodiment of the present disclosure.

As shown in FIG. 1B, the inductive wireless power transfer system 100 may have a foreign object (F.O.) 102 present within the coupling region of the electromagnetic field 105. Of course, there may be more than one foreign object 102 present. The presence of the foreign object 102 may cause problems for the inductive wireless power transfer system 100. For example, if the foreign object 102 has a sufficiently strong metallization, the foreign object 102 may receive at least some of the energy (e.g., generate eddy currents) during wireless power transfer from the transmitter 112 to the receiver 122. As a result, the foreign object 102 may steal at least a portion of the energy of the electromagnetic field 105 that is intended for the wireless power receiving apparatus 120. The foreign object 102 may reduce the energy that the wireless power receiving apparatus 120 receives, which may result in a reduced level of power transfer. In addition, if the foreign object 102 is physically between the transmitter 112 and the receiver 122, the wireless power transfer may be reduced due to the increased vertical distance between the transmitter 112 and the receiver 122.

In addition, the foreign object 102 may convert the received energy to heat. The heat generated by the foreign object 102 may cause problems such as melting materials that are part of or near the foreign object 102, and may further create fire and other hazardous conditions to the inductive wireless power transfer system 100 as well as to the end user (e.g., burn potential if contacted by the end user). For example, it has been observed that for a 5 W power delivered to the receiver 122, a metal object as small as quarter coin may absorb enough power in the metal object to induce temperature as high as 80° C.

Embodiments of the present disclosure include the inductive wireless power transfer system 100 being configured to detect the presence of the foreign object 102 within the coupling region of the inductive wireless power transfer system 100. In other words, the inductive wireless power transfer system 100 may be configured to detect the foreign object 102 located within the coupling region of the electromagnetic field 105 between the transmitter 112 and the receiver 122.

In response to detecting the foreign object 102, the inductive wireless power transfer system 100 may reduce or disable generation of the electromagnetic field 105. For example, the inductive wireless power transfer system 100 may disable the transmitter 112. In some embodiments, the inductive wireless power transfer system 100 may reduce the transmitting power of the transmitter 112 to reduce the potential for a hazardous condition of the foreign object 102 without completely stopping the charging of the wireless power receiving apparatus 120. The inductive wireless power transfer system 100 may also notify the user of the presence of the foreign object 102 for the user to take the appropriate remedial measures to remove the foreign object 102.

Embodiments of the present disclosure may include the inductive wireless power transfer system 100 to determine (e.g., measure, estimate, etc.) a coupling coefficient between the transmitter 112 and the receiver 122 during wireless power transfer. The wireless power transfer system 100 may determine a presence of a foreign object 102 within the coupling region responsive to a comparison of the determined coupling coefficient and an expected coupling coefficient for the wireless power transfer.

Figure 2:
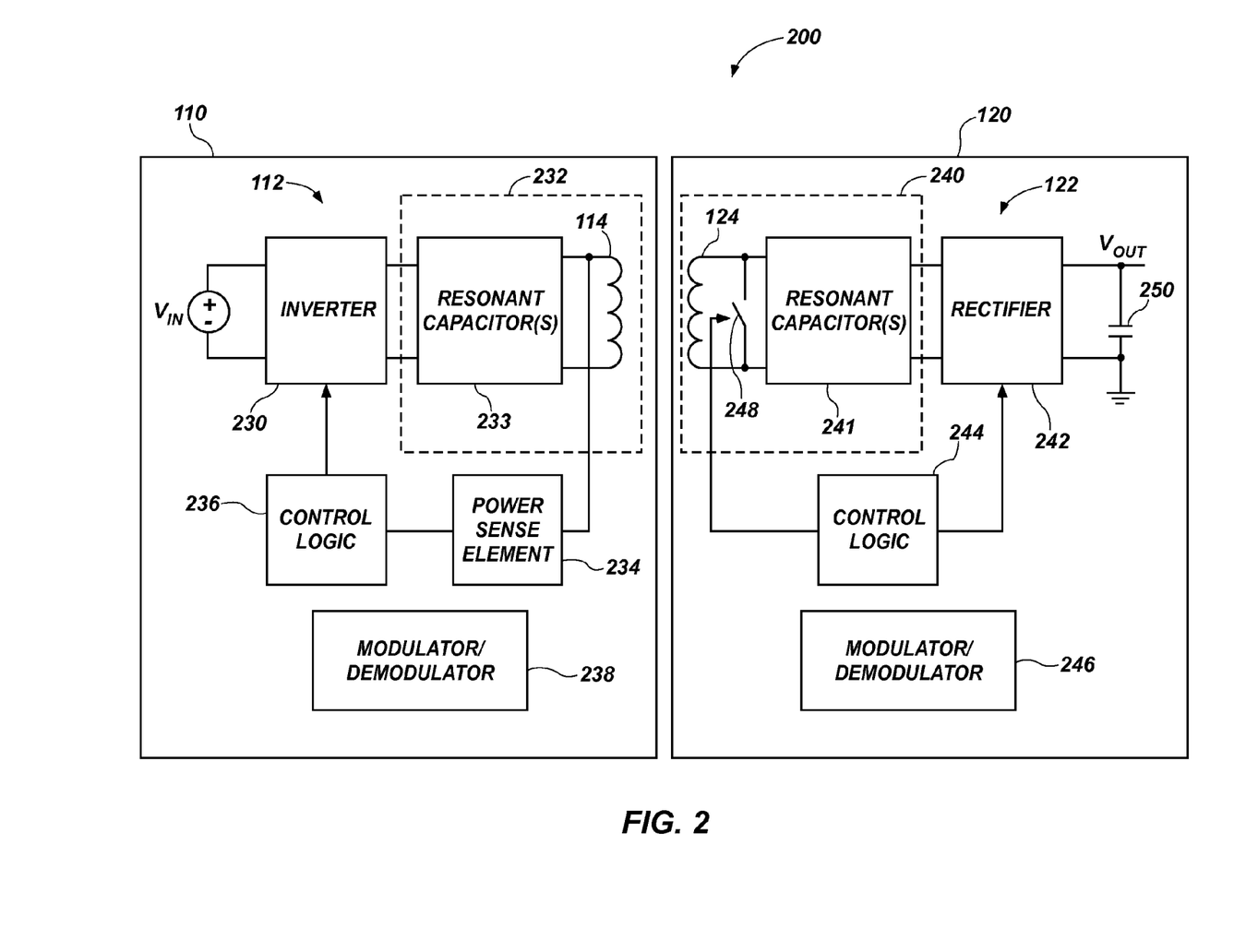
FIG. 2 is a schematic block diagram of a wireless power transfer system according to an embodiment of the present disclosure.

FIG. 2 is a schematic block diagram of a wireless power transfer system 200 according to an embodiment of the present disclosure. The wireless power transfer system 200 includes a wireless power transmitting apparatus 110, and a wireless power receiving apparatus 120 as previously discussed above with respect to FIGS. 1A and 1B. The wireless power transmitting apparatus 110 may be a wireless power charger. The wireless power receiving apparatus 120 may be any device that may operate with electric power. The wireless power receiving apparatus 120 may use the received wireless power for system power, for charging an energy storage unit (e.g., battery), or both. In some embodiments, the wireless power transmitting apparatus 110 may be also be configured to receive wireless power. In addition, some embodiments may include a wireless power receiving apparatus 120 that may also be configured to transmit wireless power. In other words, embodiments of the present disclosure may include an apparatus that includes the components described herein as being part of either wireless power transmitting apparatus 110 or the wireless power receiving apparatus 120.

The wireless power transmitting apparatus 110 includes a transmitter 112 including a transmit coil 114 configured to generate an electromagnetic field 105 for providing energy transfer to the wireless power receiving apparatus 120. The wireless power receiving apparatus 120 includes a receiver 122 including a receive coil 124 configured to receive the electromagnetic field 105 and to inductively couple with the transmit coil 114.

The transmitter 112 may further include an inverter 230, a resonant tank 232, a power sense element 234, control logic 236, and modulator/demodulator 238. The resonant tank 232 may include one or more capacitors (e.g., resonant capacitor(s) 233) coupled with an inductor (e.g., the transmit coil 114). The inverter 230 is coupled between the input voltage (VIN) and the resonant tank 232. The power sense element 234 may be coupled with the resonant tank 232. The control logic 336 may be coupled with the power sense element 234, the inverter 230, and the modulator/demodulator 238.

The receiver 122 may further include a resonant tank 240, a rectifier 242, control logic 244, and a modulator/demodulator 246. The resonant tank 240 may include an inductor (e.g., receive coil 124) coupled with one or more capacitor (e.g., resonant capacitor(s) 251). The resonant tank 240 is coupled with the rectifier 242. The control logic 244 may be coupled with the rectifier 242. The receiver 122 may further include a switch 248 and an output filter capacitor 250.

In operation of the transmitter 112, the inverter 230 and the resonant tank 232 convert the input signal ($V_{IN}$) (a DC signal) to an AC signal that can be used to transmit the electromagnetic field 105 (FIG. 1A) to the receiver 122. As current flows through the transmit coil 114, the electromagnetic field 105 is generated. The resonant tank 232 of the transmitter 112 may have a resonant frequency that may be tuned based on the inductance of the transmit coil 114 and the capacitance of the plates and configuration of the resonant capacitor(s) 233. The power sense element 234 may be configured to measure (e.g., sense) power components of the transmit coil 114 of the transmitter 112 and send the measured power components to the control logic 236. For example, the power sense element 234 may measure the voltage across the transmit coil 114, and measure the current flowing through the transmit coil 114.

In operation of the receiver 122, the electromagnetic field 105 is received by the receiver 122, and current is generated and flows through the receive coil 124. In other words, the transmit coil 114 and the receive coil 124 may be inductively coupled. Thus, the wireless power transfer system 200 may also be referred to as an inductive wireless power transfer system. The resonant frequency of the resonant tank 240 may be based on the inductance of the receive coil 124 and the capacitance of the plates of the capacitor(s) 241. If the resonant frequencies of the resonant tanks 232, 240 are substantially the same, the coupling efficiency and wireless power transfer may be improved. The resonant tank 240 generates the current (an AC signal) by coupling with the electromagnetic field 105, and the rectifier 242 converts that AC signal to the output signal $V_{OUT}$ (a DC signal). The output signal $V_{OUT}$ may be output to a load. The output signal $V_{OUT}$ may be filtered by a filter capacitor 250 and output to the load through voltage regulator (not shown).

The filter capacitor 250 and the voltage regulator may be used in some embodiments to further smooth the DC signal and set it to an appropriate DC voltage as a power output for use by the load. The load may be system components of an electronic device such that the output signal $V_{OUT}$ is used to provide system power the electronic device. The load may also be an energy storage device (e.g., battery) such that the output signal $V_{OUT}$ is used to provide the charging power for the energy storage device. Some embodiments may utilize the output signal $V_{OUT}$ to provide both system power and charging power simultaneously.

During wireless power transfer between the transmitter 112 and the receiver 122, inductive coupling may be established therebetween having a coupling coefficient (k) for the wireless power transfer. The coupling coefficient (k) is an indicator of how well electromagnetic fields couple from each of the transmit coil 114 and the receive coil 124. In other words, the coupling coefficient may affect the efficiency of the wireless power transferred from the transmitter 112 to the receiver 122. The coupling coefficient (k) may be a function of the geometries of the transmit coil 114 and the receive coil 124, the distance between the transmit coil 114 and the receive coil 124. Other factors may also contribute to the coupling coefficient, such as the materials used for the transmit coil 114 and receive coil 124, as well as other components of the wireless power transfer system 100. As an example, current wireless power transmitters (e.g., WPC TX-A1) and wireless power receivers (e.g., WPC RX-B) that have been developed by the Wireless Power Consortium may have a coupling efficiency of approximately 70% (i.e., k=0.7) at a distance (d) of 2 mm apart.

Embodiments of the present disclosure may compare an estimated coupling coefficient with a determined coupling coefficient of wireless power transfer to determine the presence of a foreign object 102 within the coupling region of the transmitter 112 and the receiver 122. The presence of a foreign object 102 within the coupling region (e.g., between the transmitter 112 and receiver 122, nearby, etc.) the wireless power transfer may be less efficient, and the coupling coefficient may decrease. In addition, the foreign object 102 itself may draw enough power to have temperature that is hazardous. Some foreign objects 102 may be small enough to not cause a significant problem.

In one embodiment, the receiver 122 may include a switch 248 coupled in parallel with the receive coil 124. The control logic 244 may control operation of the switch 248 such that at a first time ($t_0$), the switch 248 may be closed, causing a short parallel with the receive coil 124. While the switch 248 is closed, the power sense element 234 of the transmitter 112 may sense (i.e., measure) the voltage across the transmit coil 114 and the current flowing through the transmit coil 114. In other words, the transmitter 112 may determine the power components for the transmit coil 114. At a second time ($t_1$), the switch 248 may be opened causing an open circuit, resulting in a normal operation of the receive coil 124. While the switch 248 is open, the power sense element 234 of the transmitter 112 may sense the voltage across the transmit coil 114, and the current flowing through the transmit coil 114. In other words, the transmitter 112 may determine the power components for the transmit coil 114. The control logic 236 is configured to compare the power components of the transmit coil 114 when the receive coil 124 of the receiver 122 is in a shorted state, and at a second time when the receive coil 124 of the receiver 122 is not in a shorted state. For example, the ratios (R) of the sensed voltage (V)

and the sensed current (I) of the transmit coil 114 may be used to determine the coupling coefficient (k).

Based, at least in part, on a comparison of the measurements of the voltage and currents of transmit coil 114 when the switch 248 is open and closed, the wireless power transfer system 200 may determine (e.g., estimate) the coupling coefficient (k). For example, the coupling coefficient (k) may be approximated as:

$$k=\sqrt{(1-(R_{S1CLOSED}/R_{S1OPEN}))} \quad (1),$$

where $R_{S1CLOSED}$ is the ratio of the sensed voltage (V) and the sensed current (I) of the transmit coil 114 while the switch 248 of the receiver 122 is closed, and $R_{S1OPEN}$ is the ratio of the sensed voltage (V) and the sensed current (I) of the transmit coil 114 while the switch 248 is open. In other words, $R_{S1CLOSED}$ is the ratio (R) associated with the transmit coil 114 while receive coil 124 is shorted, while $R_{S1OPEN}$ is the ratio (R) associated with the transmit coil 114 while the receive coil 124 is not shorted. The ratio (R) is determined from a ratio of the sensed voltage across the transmit coil 114 and the sensed current through the transmit coil 114 as determined by the power sense element 234. For example, the ratios $R_{S1CLOSED}$ and $R_{S1OPEN}$ may be defined as:

$$R_{S1CLOSED}=V_{CLOSED}/I_{CLOSED} \quad (2);$$

and $$R_{S1OPEN}=V_{OPEN}/I_{OPEN} \quad (3),$$

where $V_{CLOSED}$ is the sensed voltage across the transmit coil 114, and $I_{CLOSED}$ is the sensed current through the transmit coil 114 when the switch 248 is closed. Similarly, $V_{OPEN}$ is the sensed voltage across the transmit coil 114, and $I_{OPEN}$ is the current through the transmit coil 114 when the switch 248 is open. The voltages $V_{CLOSED}$ and $V_{OPEN}$ may be the respective RMS voltages, and $I_{CLOSED}$ and $I_{OPEN}$ may be the respective peak-to-peak currents. Equation (1) is an example calculation that may be used to determine an approximation of the coupling coefficient. Other calculations may be used to approximate the coupling coefficient. It is to be understood, therefore, that the coupling coefficient may be determined as a relative measurement that is based, at least in part, on power components of the coils (e.g., voltage and current). Because the ratios (R) are divided from each other according to equation (1), the resulting coupling coefficient may be a unitless quantity (e.g., 0.1) that may be represented by a percentage (e.g., 10%). Equation (1) may be considered an approximation for the coupling coefficient (k). Other approximations are also contemplated. For example, the coupling coefficient (k) may be approximated by one of the following equations:

$$k=\sqrt{(1-(I_{S1CLOSED}/I_{S1OPEN}))} \quad (4),$$

where $I_{S1CLOSED}$ is the sensed current through the transmit coil 114 when the switch 248 is closed, and $I_{S1OPEN}$ is the sensed current through the transmit coil 114 when the switch 248 is open; or $$k=\sqrt{(1-(V_{S1CLOSED}/V_{S1OPEN}))} \quad (5),$$

where $V_{S1CLOSED}$ is the sensed voltage across the transmit coil 114 when the switch 248 is closed, and $V_{S1OPEN}$ is the sensed voltage across the transmit coil 114 when the switch 248 is closed. In other words, any of the power components (e.g., power, current, and voltage) may be used to approximate the coupling coefficient (k).

The control logic 236 of the transmitter 112 may be configured to determine the coupling coefficient (k) of the wireless power transfer when the receiver 122 is within the coupling region. The control logic 236 may also be configured to determine a presence of a foreign object (not shown in FIG. 2) within the coupling region responsive to a comparison of the determined coupling coefficient and an expected coupling coefficient for the wireless power transfer. The control logic 236 may determine the presence of a foreign object if the determined coupling coefficient (k) is less than an expected coupling coefficient value by a predetermined margin. In other words, there may be a predetermined threshold below the expected coupling coefficient value, at which point the wireless power transfer system 100 may determine that a reduced coupling coefficient is caused by the presence of a foreign object. The predetermined threshold below the expected coupling coefficient may exist to account for some margin for error, or for some situations in which the presence of a foreign object does not cause a hazardous or otherwise problematic situation. A plurality of different thresholds may also be implemented that have different remedial actions associated therewith.

In some embodiments, the predetermined threshold may be determined as a percentage of the expected coupling coefficient. For example, if the expected coupling coefficient is k=0.7 (i.e., 70% efficiency of wireless power transfer), the predetermined threshold may be set to be 90% of that value, such as k=0.63. Thus, if the determined coupling coefficient falls below the predetermined threshold of k=0.63, the control logic 236 may determine that a foreign object is present. In some embodiments, the predetermined threshold may be determined as a difference of the expected coupling coefficient and the determined coupling coefficient. For example, the predetermined threshold may be set to be a coupling coefficient that is 0.1 less than the expected coupling coefficient. If the expected coupling coefficient is k=0.7, the predetermined threshold may be set to be 0.1 less than that value, such as k=0.6. Thus, if the determined coupling coefficient falls below the predetermined threshold of k=0.6, the control logic 236 may determine that a foreign object is present. As another example involving the predetermined threshold being determined as a difference of the expected coupling coefficient and the determined coupling coefficient, the difference of such may be determined and compared to a desired maximum difference value. For example, the determined coupling coefficient (e.g., k=0.55) may be subtracted from the expected coupling coefficient (e.g., k=0.7) resulting in a difference value (e.g., 0.7−0.55=0.15). If the difference value (e.g., 0.15) is greater than the desired maximum difference value (e.g., 0.1), the control logic 236 may determine that a foreign object is present.

In some embodiments, the threshold value(s) may be fixed values programmed in memory for use by the control logic 236. In other embodiments, the threshold value(s) may be changed over time as changes are made to components of the wireless power transfer system 100. In some embodiments, the threshold value(s) may change during use according to different operational modes of the wireless power transfer system 100. For example, a first operational mode may have a threshold of k=0.6, whereas a second operational mode may have a threshold of k=0.55. In addition, the expected coupling coefficient (and therefore also the threshold) may have a variable value over time, which may employ a look-up table or calculation to determine in real time as conditions (e.g., environment, operating mode) change.

It is recognized that an expected coupling coefficient may be depend on characteristics of the wireless power transfer system, such as the materials of the transmit coil 114 and the receive coil 124, as well as environmental factors, such as the distance between the transmitter 112 and the receiver 122 during wireless power transfer. In one embodiment, the expected coupling coefficient may be determined based on an assumed fixed distance between the transmitter 112 and the receiver 122. For example, a fixed distance may be ensured by employing a magnetically-guided topology that aligns the transmitter 112 and the receiver 122. In such an embodiment, the transmitter 112 may include a magnet, while the receiver 122 may include an attractor (or vice versa) that align the two within a relatively tight fixed vertical distance (e.g., 2 mm).

In some embodiments, the expected coupling coefficient is determined based on a variable distance between the transmitter 112 and the receiver 122 distance during wireless power transfer. In other words, the distance between the transmitter 112 and the receiver 122 may be determined in real time prior to determining both the expected coupling coefficient and the threshold for the presence of the foreign object. As a result, the determined distance value may be used to calculate the expected coupling coefficient. For example, the distance value may be entered into a formula providing the expected coupling coefficient for the particular distance value. In another embodiment, a plurality of predetermined thresholds may be stored in memory for a plurality of different distance values, such as in a lookup table. The expected coupling coefficient may be compared with the determined coupling coefficient to determine the presence of the foreign object.

The switch 248 may be a separate switch from the other components of the receiver 122. In some embodiments, however, the switch 248 may be shared by one or more of the components of the receiver 122. For example, the rectifier 242 may be a synchronous rectifier configuration that includes a plurality of switches that are configured to convert the AC signal to the DC signal to be output to the load. In such an embodiment, the switch 248 that is controlled by the control logic 244 to open and close may be one or more switches of the rectifier 242 to perform the short circuit and open circuit of the receive coil 124. In other words, the switch 248 coupled parallel with the receive coil 124 for altering the wireless power transfer characteristic (e.g., resistance) of the transmitter 112 is one of the plurality of switches of the rectifier 242 used for converting the AC signal to the DC signal output to the load. In other embodiments, the switch 248 coupled parallel with the receive coil 124 for altering the wireless power transfer characteristic of the transmitter 112 is separate from the rectifier 242 used for converting the AC signal to the DC signal output to the load. For example, the rectifier 242 may be an asynchronous rectifier that includes one or more diodes without including active switches. In such an embodiment, the switch 248 that is controlled by the control logic 244 to open and close (causing a short and open circuit of the receive coil 124) may be the separate switch 248 shown in FIG. 2.

Determination of the coupling coefficient may be initiated on either the transmitter side or the receiver side, as desired. For example, the transmitter 112 may send an initiation command to the receiver 122, which responsively opens and closes the switch 248. In another example, the receiver 122 may initiate the open circuit and close circuit of the switch 248. In such an embodiment, the receiver 122 may transmit a command to the transmitter 112, which responsively performs the appropriate measurements of the power components at the proper time. In another embodiment, the transmitter 112 may monitor the change in the power components over a time window that is known for the receiver 122 to be in a short state and a non-short state without the need for transmitting a command. Communication between the transmitter 112 and the receiver 122 may be facilitated by modulators/demodulators 238, 246. In some embodiments, communication may be through separate RF coils (not shown), while in other embodiments, communication may be through the transmit coil 114 and the receive coil 124.

Figure 3:
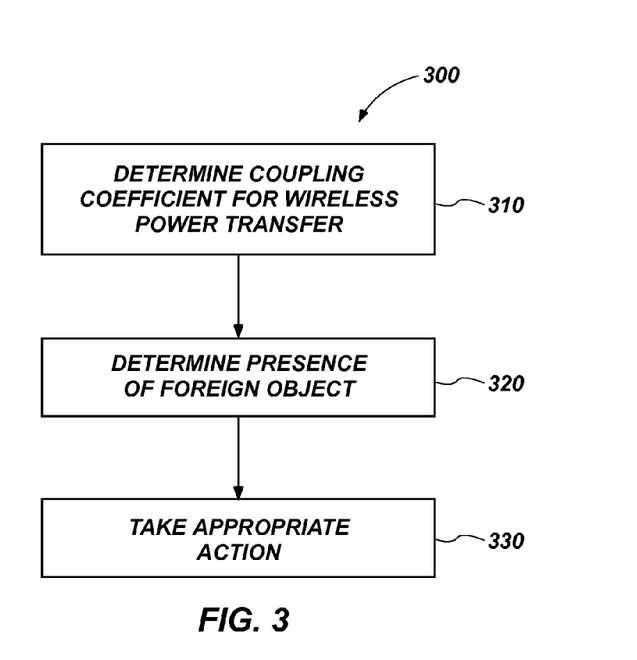
FIG. 3 is a flow chart illustrating a method of detecting a foreign object in a coupling region of an inductive wireless power transfer system according to an embodiment of the present disclosure.

FIG. 3 is a flow chart 300 illustrating a method of detecting a foreign object in a coupling region of an inductive wireless power transfer system. At operation 310, a coupling coefficient (k) for wireless power transfer between a transmitter and a receiver may be determined. The coupling coefficient may be determined by measuring the power components of the transmitter when the receiver is in a shorted state, and measuring the power components when the receiver is in a non-shorted state. The power components may include the voltage across the transmit coil and the current flowing through the transmit coil. The measured power components at each state may be compared to determine the coupling coefficient. For example, the resistance of the transmit coil may be determined for each state, and the coupling coefficient may be estimated by equation (1).

At operation 320, a presence of a foreign object within the coupling region may be determined based, at least in part, on a comparison of the determined coupling coefficient and an expected coupling coefficient. The comparison of the determined coupling coefficient and the expected coupling coefficient may be based on a predetermined threshold related to the expected coupling coefficient. For example, the predetermined threshold may be a percentage of the expected coupling coefficient, a difference, or some other predetermined value used for comparison. The expected coupling coefficient and/or the predetermined threshold may be based on an assumption of a fixed vertical distance between the transmitter and the receiver, such as may be present in a magnetically-guided topology. In other embodiments, the expected coupling coefficient and/or the predetermined threshold may be based on an assumption of a variable vertical distance between the transmitter and the receiver. For example, the distance between the transmitter and the receiver may be determined during operation in order to determine (e.g., through calculation, look-up tables, etc.) the expected coupling coefficient and/or predetermined thresholds.

At operation 330, appropriate action may be taken based on the outcome of the determination of operation 320. For example, if it is determined that no foreign object is present, wireless power transfer may be enabled according to normal operation of the wireless power transfer system. If it is determined that a foreign object is present, wireless power transfer may be disabled. For situations where the foreign object is present, but only has a minimal impact on wireless power transfer and/or presents a minimal risk of a hazardous situation, the wireless power transfer may be enabled at a reduced level. Reducing or disabling the wireless power transfer may include reducing or stopping generation of the electromagnetic field generated by the transmitter. Thus, a plurality of thresholds may be implemented, such that each threshold may have its own remedial actions associated therewith. Another action may include notifying (i.e., informing) the user of the wireless power transfer system that a foreign object is present, such as through a message, alarm, light, etc. The user may be prompted to remove the foreign object.

Operations 310 through 330 may be performed prior to main wireless power transfer, such as an initiation procedure after the presence of the transmitter and the receiver is acknowledged. For example, when the transmitter detects the presence of the receiver in the coupling field (e.g., through a ping state), the transmitter and the receiver may enter a configuration and identification state prior to performing wireless power transfer. The coupling coefficient may be determined as well as the presence of the foreign object may also be performed prior to performing wireless power transfer, such as before, during, or after the configuration and identification state. Embodiments of the present disclosure also include the determination of the coupling coefficient and the presence of the foreign object to occur periodically during the wireless power transfer so that a foreign object that enters the coupling region at a later time may be detected as well.

Figure 4:
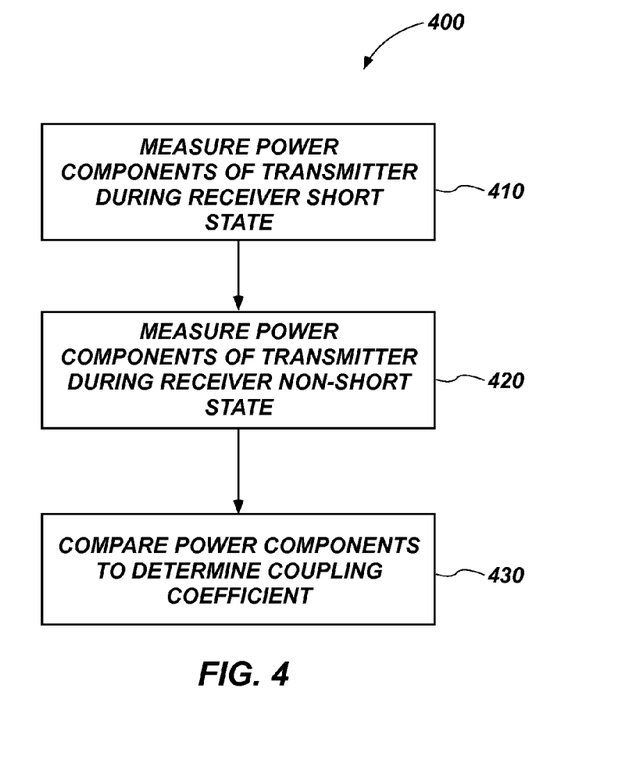
FIG. 4 is a flow chart illustrating a method for determining a coupling coefficient for wireless power transfer in a wireless power transfer system according to an embodiment of the present disclosure.

FIG. 4 is a flow chart 400 illustrating a method for determining a coupling coefficient for wireless power transfer in a wireless power transfer system. At operation 410, power components of the transmitter may be measured during a short state of the receiver. For example, the receiver may close a switch in parallel with the receive coil, during which time the transmitter may measure the power components. At operation 420, power components of the transmitter may be measured during a non-short state of the receiver. For example, the receiver may open a switch in parallel with the receive coil, during which time the transmitter may measure the power components. The power components of the transmitter may include the voltage across the transmit coil and the current through the transmit coil.

At operation 430, the power components of the short state may be compared with the power components of the non-short state to determine the coupling coefficient. For example, the power components may be calculated in terms of the resistance of the transmitter during each state, and the coupling coefficient may be estimated according to a formula, such as equation (1). With the determined coupling coefficient, the wireless power transfer system may determine the presence of a foreign object in the coupling region as discussed above.

Figure 5:
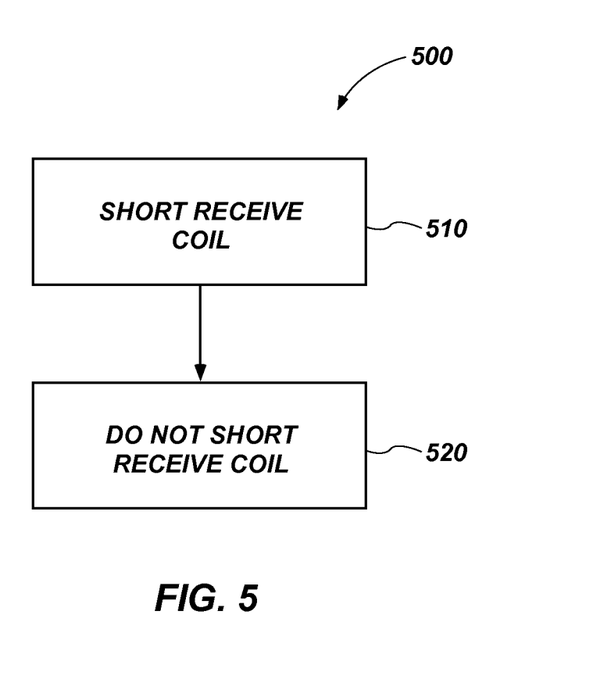
FIG. 5 is a flow chart illustrating a method for altering a wireless power transfer characteristic of the transmitter for a determination of a presence of a foreign object within the coupling region of a wireless power transfer system according to an embodiment of the present disclosure.

FIG. 5 is a flow chart 500 illustrating a method for altering a wireless power transfer characteristic of the transmitter for a determination of a presence of a foreign object within the coupling region of a wireless power transfer system according to an embodiment of the present disclosure. The determination of the presence of the foreign object may be responsive to a determination of a coupling coefficient of the wireless power transfer.

At operation 510, the receive coil of the receiver may be shorted. For example, a switch coupled parallel with the receive coil may be closed. At operation 520, the receive coil of the receiver may operate in a non-shorted state. For example, a switch coupled parallel with the receive coil may be open. While the receive coil is in a shorted state and a non-shorted state, a wireless power transfer characteristic of the transmitter may be altered. For example, because of the inductive coupling of the transmitter and receiver, the resistance of the transmit coil may be altered. During each state, the power components of the transmitter may be measured. For example, the voltage (e.g., RMS voltage) across the transmit coil and the current through the transmit coil (e.g., peak-to-peak current) may be measured while the switch parallel with the receive coil is closed, and also while the switch is open. In other words, during the operations 510, 520, a mobile device may short circuit and open circuit the switch parallel with the receive coil for a duration that is long enough for the transmitter to measure a voltage across transmit coil and the current through the transmit coil in both the open and short conditions of the receive coil. With the measured power components of the transmitter, the coupling coefficient (k) may be determined, as well the presence of the foreign object, as discussed above.

While the present disclosure has been described herein with respect to certain illustrated embodiments, those of ordinary skill in the art will recognize and appreciate that the present invention is not so limited. Rather, many additions, deletions, and modifications to the illustrated and described embodiments may be made without departing from the scope of the invention as hereinafter claimed along with their legal equivalents. In addition, features from one embodiment may be combined with features of another embodiment while still being encompassed within the scope of the invention as contemplated by the inventor.

What is claimed is:

1. An inductive wireless power device, comprising:
a transmitter configured to generate an electromagnetic field to a coupling region for wireless power transfer to a receiver;
a predefined coupling coefficient for the wireless power transfer; and
a control logic configured to determine a coupling coefficient of the wireless power transfer when the receiver is within the coupling region by detecting a change in a wireless power transfer characteristic caused by the receiver at a first time and a second time, and to determine a presence of a foreign object within the coupling region responsive to a comparison of the determined coupling coefficient and the predefined coupling coefficient for the wireless power transfer.

2. The inductive wireless power device of claim 1, wherein the control logic is configured to determine that the foreign object is present within the coupling region when the determined coupling coefficient is by a predetermined threshold below the predefined coupling coefficient.

3. The inductive wireless power device of claim 2, wherein the predetermined threshold is determined as a percentage of the predefined coupling coefficient.

4. The inductive wireless power device of claim 2, wherein the predetermined threshold is determined as a difference of the predefined coupling coefficient and the determined coupling coefficient.

5. The inductive wireless power device of claim 1, further comprising a power sense element coupled to a transmit coil of the transmitter and to the control logic, the power sense element configured to measure power components of the transmit coil of the transmitter, and to send the measured power components to the control logic, wherein the coupling coefficient is based, at least in part, on the power components.

6. The inductive wireless power device of claim 5, wherein the measured power components includes a voltage across the transmit coil and a current flowing through the transmit coil.

7. The inductive wireless power device of claim 5, wherein the coupling coefficient is determined as approximately $\sqrt{(1-R_{S1\,CLOSED}/R_{S1\,OPEN})}$, wherein $R_{S1\,CLOSED}$ is a resistance of the transmit coil during the first time, and $R_{S1\,OPEN}$ is a resistance of the transmit coil during the second time.

8. The inductive wireless power device of claim 5, wherein the control logic is configured to compare the power components of the transmit coil at the first time when a receiver coil of the receiver is in a shorted state through a path parallel to the receiver coil, and at the second time when the receiver coil of the receiver is not in the shorted state.

9. An inductive wireless power device, comprising a receiver configured to couple with an electromagnetic field in a coupling region for inductive wireless power transfer from a transmitter, wherein the receiver includes a receive coil configured to generate an AC signal responsive to coupling with the electromagnetic field, wherein the receiver is configured to alter a wireless power transfer characteristic of the transmitter by shorting the receive coil through a path parallel to the receiver coil at a first time, and to not short the receive coil at a second time, wherein shorting the receive coil through the path parallel to the receiver coil includes directly connecting across the receive coil.

10. The inductive wireless power device of claim 9, wherein the receiver further comprises a switch coupled in parallel with the receive coil, such that enablement of the switch shorts the receive coil through the path, wherein the receiver is configured to enable the switch at the first time and disable the switch at the second time.

11. The inductive wireless power device of claim 10, wherein the receiver further comprises a rectifier configured to convert the AC signal from the receive coil to a DC signal to be output to a load.

12. The inductive wireless power device of claim 11, wherein the rectifier is a synchronous rectifier including a plurality of switches for converting the AC signal to the DC signal to be output to the load.

13. The inductive wireless power device of claim 12, wherein the switch coupled parallel with the receive coil for altering the wireless power transfer characteristic of the transmitter is one plurality of switches of the rectifier used for converting the AC signal to the DC signal to be output to the load.

14. The inductive wireless power device of claim 11, wherein the switch coupled parallel with the receive coil for altering the wireless power transfer characteristic of the transmitter is separate from the rectifier used for converting the AC signal to the DC signal to be output to the load.

15. An inductive wireless power transfer system, comprising:
a wireless power transmitting apparatus configured to generate an electromagnetic field in a coupling region for wireless power transfer;
a predefined coupling coefficient for the wireless power transfer; and
a wireless power receiving apparatus configured to couple with the electromagnetic field and generate an output signal in response thereto and to alter a wireless power transfer characteristic of the wireless power transmitting apparatus at a first time and a second time by shorting across a receive coil of the wireless power receiving apparatus at the first time and not shorting across the receive coil at the second time, wherein at least one of the wireless power transmitting apparatus and the wireless power receiving apparatus is configured to determine a coupling coefficient by a first comparison of the wireless power transfer characteristic at the first time and the second time, and determining the presence of a foreign object within the coupling region based, at least in part, on a second comparison of the coupling coefficient for the wireless power transfer between the wireless power transmitting apparatus and the wireless power receiving apparatus, and the predefined coupling coefficient for the wireless power transfer, wherein shorting across the receive coil includes directly connecting across the receive coil.

16. The inductive wireless power transfer system of claim 15, wherein the wireless power receiving apparatus includes a mobile electronic device.

17. The inductive wireless power transfer system of claim 15, wherein the wireless power transmitting apparatus includes control logic configured to compare the determined coupling coefficient to a predetermined threshold to determine the presence of the foreign object.

18. The inductive wireless power transfer system of claim 17, wherein the predetermined threshold is relative to an expected coupling coefficient for a fixed distance between the wireless power transmitting apparatus and the wireless power receiving apparatus.

19. A method for detecting a foreign object in a coupling region of an inductive wireless power transfer system, the method comprising:
determining a predefined coupling coefficient for the inductive wireless power transfer system;
detecting a change in an inductive wireless power transfer characteristic of a transmitter caused by a receiver at a first time and a second time, wherein the receiver shorts across a receiver coil at the first time and provides no short across the receiver coil at the second time;
determining a coupling coefficient for wireless power transfer between the transmitter and the receiver based on the change; and
determining a presence of a foreign object based, at least in part, on a comparison of the determined coupling coefficient and the predefined coupling coefficient.

20. The method of claim 19, further comprising taking an action on the inductive wireless power transfer system in response to determining the presence of the foreign object.

21. The method of claim 20, wherein the action is at least one of reducing the wireless power transfer, disabling wireless power transfer, and notifying a user that the foreign object is present within the coupling region.

22. A method for altering a wireless power transfer characteristic of a wireless power transmitter for a determination of a presence of a foreign object within a coupling region of a wireless power transfer system based on a first state of a wireless power transfer characteristic and a second state of the wireless power transfer characteristic, the method comprising:
determining a predefined coupling coefficient for the inductive wireless power transfer system;
shorting a receive coil of a receiver by directly connecting across the receive coil in a path parallel with the receive coil at a first time for a wireless power transmitter to determine a wireless power transfer characteristic in the first state; and
operating the receive coil of the receiver in a non-shorted state for the wireless power transmitter to determine the wireless power transfer characteristic in the second state;
determining a coupling coefficient for wireless power transfer between the transmitter and the receiver based at least on the first state of the wireless power transfer characteristic and the second state of the wireless power transfer characteristic;
determining the presence of a foreign object based, at least in part, on a comparison of the determined coupling coefficient and the predefined coupling coefficient.

23. The method of claim 22, wherein shorting the receive coil includes closing a switch coupled in parallel with the receive coil, and wherein operating the receive coil in the non-shorted state includes opening the switch.

24. The inductive wireless power transfer system of claim 15, wherein the coupling coefficient is determined as approximately $\sqrt{(1-R_{S1CLOSED}/R_{S1OPEN})}$, wherein $R_{S1CLOSED}$ is a resistance of the transmit coil of the wireless power transmitting apparatus during the first time, and $R_{S1OPEN}$ is a resistance of the transmit coil of the wireless power transmitting apparatus during the second time.

\* \* \* \* \*